United States Patent
Taccola et al.

(10) Patent No.: US 10,184,833 B2
(45) Date of Patent: Jan. 22, 2019

(54) IMAGING SPECTROMETER WITH REFLECTIVE GRATING

(71) Applicant: European Space Agency, Paris (FR)

(72) Inventors: Matteo Taccola, Paris (FR); Munadi Ahmad, London (GB)

(73) Assignee: European Space Agency, Paris (FR)

( * ) Notice: Subject to any disclaimer, the term of this patent is extended or adjusted under 35 U.S.C. 154(b) by 25 days.

(21) Appl. No.: 15/718,475

(22) Filed: Sep. 28, 2017

(65) Prior Publication Data

US 2018/0094977 A1    Apr. 5, 2018

(30) Foreign Application Priority Data

Sep. 30, 2016    (EP) .................................... 16191731

(51) Int. Cl.
| | |
|---|---|
| *G01J 3/26* | (2006.01) |
| *G01J 3/18* | (2006.01) |
| *G01J 3/28* | (2006.01) |
| *G02B 5/18* | (2006.01) |
| *G02B 17/06* | (2006.01) |
| *G01J 3/02* | (2006.01) |

(52) U.S. Cl.
CPC ................. *G01J 3/26* (2013.01); *G01J 3/021* (2013.01); *G01J 3/0291* (2013.01); *G01J 3/18* (2013.01); *G01J 3/1809* (2013.01); *G01J 3/2823* (2013.01); *G02B 5/1861* (2013.01); *G02B 17/061* (2013.01); *G02B 17/0615* (2013.01); *G01J 2003/262* (2013.01)

(58) Field of Classification Search
CPC ...................................................... G01J 3/26

USPC ......................................................... 356/328
See application file for complete search history.

(56) References Cited

U.S. PATENT DOCUMENTS

| | | | |
|---|---|---|---|
| 3,922,089 A * | 11/1975 | Danielsson | ........... G01J 3/1809 356/300 |
| 5,260,767 A | 11/1993 | Cook | |
| 2005/0051729 A1 * | 3/2005 | Chrisp | ...................... G01J 3/02 250/339.07 |
| 2007/0252989 A1 * | 11/2007 | Comstock | ................. G01J 3/02 356/328 |

(Continued)

FOREIGN PATENT DOCUMENTS

CN            105115603 A       12/2015

*Primary Examiner* — Tarifur Chowdhury
*Assistant Examiner* — Omar Nixon
(74) *Attorney, Agent, or Firm* — Seed Intellectual Property Law Group LLP

(57) ABSTRACT

An imaging spectrometer receives a beam of light from a slit and outputs the beam of light to a focal plane. The output beam of light at the focal plane is dispersed in accordance with a spectral composition of the beam of light received from the slit. The imaging spectrometer comprises first to fourth curved reflective portions. The first to fourth curved reflective portions are arranged so that the beam of light, in its passage from the slit to the focal plane, sequentially strikes the first to fourth curved reflective portions and is reflected by the first to fourth curved reflective portions. Further, the first to fourth curved reflective portions are alternatingly concave or convex, respectively, along the passage of the beam of light. At least one of the first to fourth curved reflective portions has a reflective grating structure. Further disclosed is a method of manufacturing such imaging spectrometer.

18 Claims, 8 Drawing Sheets

(56) References Cited

U.S. PATENT DOCUMENTS

| | | |
|---|---|---|
| 2013/0182250 A1 | 7/2013 | McClure |
| 2014/0071449 A1* | 3/2014 | Robinson .............. G01J 3/0291 |
| | | 356/328 |
| 2014/0118738 A1* | 5/2014 | Comstock, II ........ G01J 3/2823 |
| | | 356/328 |

* cited by examiner

IMAGING SPECTROMETER WITH REFLECTIVE GRATING

BACKGROUND

Technical Field

This application relates to imaging spectrometers and to methods for manufacturing imaging spectrometers. The application particularly relates to imaging spectrometers with a reflective grating and to methods of manufacturing such imaging spectrometers.

Description of the Related Art

Imaging spectrometers are important optical instruments for earth observation and science missions, for example. Many imaging spectrometer instruments are based on mirror designs with reflective gratings and most of these designs can achieve only unit magnification or magnification ratios very close to one. For some applications, the possibility to have a spectrometer with a magnification value different from one is a key factor to enable instrument designs that are compact, cost effective, and offer high performance.

Optical instruments with an imaging spectrometer are normally based on the following concept: a telescope focuses light on the entrance slit of the spectrometer. The light is then usually collimated, spectrally dispersed, and refocused on the focal plane. The overall focal length of the instrument is given by the product of the telescope focal length and spectrometer magnification. The spectrometer magnification is given by the ratio between the size of the image of the slit on the focal plane and the size of the slit itself.

The most common optical design for reflective imaging spectrometers are based on the Offner design (e.g., VIRTIS on Rosetta or Mertis on BepiColombo) or the Dyson design (e.g., OLCI on Sentinel 3). Some instruments are also based on a double pass telescope and a flat grating in a Littrow configuration. However, these concepts can achieve only unit magnification or magnification values close to one. The reason is that changing the magnification value for these designs would alter the symmetry of the configuration and lead to strong aberrations and therefore poor image quality.

For some applications, the possibility to use a spectrometer with a magnification different from one is a key factor to enable instrument designs that are compact, cost effective, and offer high performance.

For example, several high resolution imagers for Earth observation have both high spatial resolution panchromatic (PAN) channel and hyperspectral (HS) or multispectral (MS) channels with a lower spatial resolution. By merging high-resolution panchromatic and lower resolution multispectral imagery, it is possible to create a single high-resolution color image. This process is called PAN sharpening. For these instruments, the possibility to have a lower magnification for the spectral channels with respect to the panchromatic channel would be a clear advantage.

One specific example in which the use of a spectrometer with a magnification different from one would be desirable relates to the design proposed for the VNREDSat joint mission between Vietnam and Belgium. Therein, a common Three Mirror Anastigmat (TMA) telescope is proposed to be used for PAN and HS. PAN and HS are in field separated and no further optics are required for the PAN after the telescope beside a folding mirror. The spectrometer design proposed for VNREDSat is an evolution of the Offner design and requires two high order aspherical mirrors and a freeform grating to compensate the loss of symmetry of the typical Offner configuration. The spectrometer magnification achieved with this design has a value of 0.5. Attempts to achieve a lower magnification value did not bring acceptable results in terms of image quality. Moreover, the manufacturing of the freeform grating clearly is a critical aspect of the design.

As another example, having available an imaging spectrometer that has a magnification value different from one would be desirable for reducing the overall length of an optical instrument. This is illustrated in FIG. 1A and FIG. 1B. If an imaging spectrometer 10 with unit magnification is used (classical design), the overall focal length of the instrument is given by the focal length of the telescope 40. This is shown in FIG. 1A. In case a larger magnification for the imaging spectrometer 10 is possible (e.g., 3× magnification), the focal length of the telescope can be reduced by the same factor, which leads to a substantial reduction of the telescope size and of the overall instrument dimensions. This is shown in FIG. 1B.

Thus, there is a need for improved imaging spectrometers that allow to obtain magnification values different from one (both larger and smaller, depending on the intended use), and for methods of manufacturing such imaging spectrometers. There further is a need for such imaging spectrometers that do not negatively affect image quality, e.g., that do not introduce strong aberrations, and for methods of manufacturing such imaging spectrometers.

BRIEF SUMMARY

In view of some or all of these needs, the present disclosure proposes an imaging spectrometer and a method of manufacturing an imaging spectrometer, having the features of the respective independent claims.

An aspect of the disclosure relates to an imaging spectrometer for receiving a beam of light from a slit and outputting the beam of light to a focal plane. The output beam of light at the focal plane may be dispersed in accordance with a spectral composition (e.g., spectrum) of the beam of light received from the slit. The imaging spectrometer may comprise first to fourth curved reflective portions. A curved shape in the context of the present disclosure may refer to any of spherical shape, parabolic shape, conical shape, or freeform shape, for example. The first to fourth curved reflective portions may be arranged so that the beam of light, in its passage from the slit to the focal plane, sequentially strikes (e.g., impinges on) the first to fourth curved reflective portions and is reflected by the first to fourth curved reflective portions. That is, the beam of light may first strike the first curved reflective portion, then the second curved reflective portion, the third curved reflective portion, and finally the fourth curved reflective portion. The first to fourth curved reflective portions may be alternatingly concave or convex, respectively, along the passage of the beam of light. For example, the first curved reflective portion may be concave, the second curved reflective portion may be convex, and so forth. Alternatively, the first curved reflective portion may be convex, the second curved reflective portion may be concave, and so forth. At least one of the first to fourth curved reflective portions may have a reflective grating structure. That is, at least one of the first to fourth curved reflective portions may have a reflective grating formed thereon. For example, two of the first to fourth curved reflective portions may have respective reflective grating structures.

Configured as such, the inventive imaging spectrometer based on a reflective grating can achieve a magnification value significantly different from one, both larger and smaller than one. In particular, the imaging spectrometer can achieve magnification values smaller than 0.5 and larger than two. The possibility to achieve a magnification larger than one allows to design optical instruments including the imaging spectrometer that are more compact, lighter, and smaller than comparable optical instruments using a conventional imaging spectrometer. The above design of the imaging spectrometer is very flexible and can be readily adapted to respective requirements and applications. Moreover, the imaging spectrometer can work with conventional reflective gratings (as opposed to freeform gratings, which are difficult to manufacture and therefore expensive).

In embodiments, the first and third curved reflective portions may be formed on a first reflective optical element. The first reflective optical element may be curved. Further, the first reflective optical element may be monolithically formed, i.e., be a monolithic, or integral, optical element. In other words, the first and third curved reflective portions may relate to different regions, or areas, of the same (first) optical element. Likewise, the second and fourth curved reflective portions may be formed on a second reflective optical element. The second reflective optical element may be arranged opposite the first reflective optical element. That is, the first reflective optical element (e.g., the reflective surface or side of the first reflective optical element) may face the second reflective optical element (e.g., the reflective surface or side of the second reflective optical element). The second reflective optical element may be curved. Further, the second reflective optical element may be monolithically formed, i.e., be a monolithic, or integral, optical element. In other words, the second and fourth curved reflective portions may relate to different regions, or areas, of the same (second) optical element. Configured as such, the imaging spectrometer allows to achieve a magnification value different from one with a very low number of optical elements (e.g., one grating and one mirror) and for a very compact design.

In embodiments, one of the first and second reflective optical elements may be concave and the other one of the first and second reflective optical elements may be convex. That is, one of the first and second reflective optical elements may have a concave shape and the other one of the first and second reflective optical elements may have a convex shape. A concave reflective surface of the one of the first and second reflective optical elements may face a convex reflective surface of the other one of the first and second reflective optical elements.

In embodiments, one of the first and second reflective optical elements may be an optical mirror and the other one of the first and second reflective optical elements may have a first region in which a first reflective optical grating structure is formed. One of the first to fourth curved reflective portions may be arranged in the first region and may have the first reflective optical grating structure.

In embodiments, the other one of the first and second reflective optical elements may have a second region in which a second reflective optical grating structure is formed. Another one of the first to fourth curved reflective portions may be arranged in the second region and may have the second reflective optical grating structure. The first and second regions may be curved. The first and/or second optical grating structures may relate to a blazed grating. The other one of the first to fourth curved reflective portions may not be arranged immediately before or after the one of the first to fourth curved reflective portions along the passage of the beam of light from the slit to the focal plane. For example, if the one of the first to fourth curved reflective portions is the second curved reflective portion, the other one of the first to fourth curved reflective portions may not be the first curved reflective portion or the third curved reflective portion, but only the fourth curved reflective portion.

In embodiments, the first and second reflective optical grating structures may differ in at least one geometric parameter. For example, the geometric parameter may be a lattice parameter, such as the blaze angle. In this case, it may be said that a multi-blazed grating is formed on the other one of the first and second reflective optical elements.

In embodiments, the other one of the first and second reflective optical elements may have a second region in which an optical mirror structure is formed. Another one of the first to fourth curved reflective portions may be arranged in the second region and have the optical mirror structure. In this case, the other one of the first and second reflective optical elements may be said to have a mirror area and a grating area. The other one of the first to fourth curved reflective portions may not be arranged immediately before or after the one of the first to fourth curved reflective portions along the passage of the beam of light from the slit to the focal plane. For example, if the one of the first to fourth curved reflective portions is the second curved reflective portion, the other one of the first to fourth curved reflective portions may not be the first curved reflective portion or the third curved reflective portion, but only the fourth curved reflective portion.

In embodiments, the one of the first and second reflective optical elements may have third and fourth regions in which respective ones of the first to fourth curved reflective portions are arranged. A curvature of the third region may differ from a curvature of the fourth region.

In embodiments, the one of the first and second reflective optical elements and the other one of the first and second reflective optical elements may be both conically shaped. In embodiments, the one of the first and second reflective optical elements may be conically shaped and the other one of the first and second reflective optical elements may be parabolically shaped. In embodiments, the one of the first and second reflective optical elements may be a freeform mirror and the other one of the first and second reflective optical elements may be spherically shaped.

Another aspect of the disclosure relates to a method of manufacturing an imaging spectrometer for receiving a beam of light from a slit and outputting the beam of light to a focal plane. The output beam of light at the focal plane may be dispersed in accordance with a spectral composition of the beam of light received from the slit. The method may comprise providing first to fourth curved reflective portions, of which two are concave and two are convex, and of which at least one has a reflective grating structure. The method may further comprise arranging the first to fourth curved reflective portions so that the beam of light, in its passage from the slit to the focal plane, sequentially strikes the first to fourth curved reflective portions and is reflected by the first to fourth curved reflective portions, and so that the first to fourth curved reflective portions, along the passage of the beam of light, are alternatingly concave or convex, respectively.

In embodiments, providing the first to fourth curved reflective portions may involve providing a first reflective optical element and a second reflective optical element. The second reflective optical element may be arranged opposite the first reflective optical element. That is, the first reflective optical element (e.g., the reflective surface or side of the first reflective optical element) may face the second reflective optical element (e.g., the reflective surface or side of the second reflective optical element). Providing the first to fourth curved reflective portions may further involve processing a surface of the first reflective optical element to provide the first and third reflective portions on the first reflective optical element. Providing the first to fourth curved reflective portions may yet further involve processing a surface of the second reflective optical element to provide the second and fourth curved reflective portions on the second reflective optical element. Arranging the first to fourth curved reflective portions may involve arranging the first and second reflective optical elements so that the beam of light, in its passage from the slit to the focal plane, sequentially strikes the first to fourth curved reflective portions and is reflected by the first to fourth curved reflective portions. The one of the first and second reflective optical elements may be either concave or convex. The other one of the first and second reflective optical elements may be concave if the one of the first and second reflective optical elements is convex, and may be convex if the one of the first and second reflective optical elements is concave. If the one of the first and second reflective optical elements is concave, a concave reflective surface of the one of the first and second reflective optical elements may face a convex reflective surface of the other one of the first and second reflective optical elements. If the one of the first and second reflective optical elements is convex, a convex reflective surface of the one of the first and second reflective optical elements may face a concave reflective surface of the other one of the first and second reflective optical elements.

Notably, the present disclosure is understood to extend to any manufacturing methods adapted to manufacture any of the imaging spectrometers described above, and to respective imaging spectrometers that result from the manufacturing methods described above.

Moreover, it will be appreciated that method steps and apparatus features may be interchanged in many ways. Respective statements made with regard to the imaging spectrometers likewise apply to the corresponding manufacturing methods, and vice versa.

BRIEF DESCRIPTION OF THE SEVERAL VIEWS OF THE DRAWINGS

Embodiments of the disclosure are explained below in an exemplary manner with reference to the accompanying drawings, wherein FIG. 1A and FIG. 1B schematically illustrate examples of optical instruments including a telescope and an imaging spectrometer, FIG. 2 schematically illustrates a lateral view of an example of an imaging spectrometer according to embodiments of the disclosure, FIG. 3 schematically illustrates a lateral view of another example of an imaging spectrometer according to embodiments of the disclosure, FIG. 4A and FIG. 4B schematically illustrate a lateral view and a top view of another example of an imaging spectrometer according to embodiments of the disclosure, FIG. 5A and FIG. 5B schematically illustrate a lateral view and a top view of another example of an imaging spectrometer according to embodiments of the disclosure, FIG. 6A and FIG. 6B schematically illustrate different configurations of a multi-blazed grating structure for use in imaging spectrometers according to embodiments of the disclosure.

DETAILED DESCRIPTION

Figure 1A:
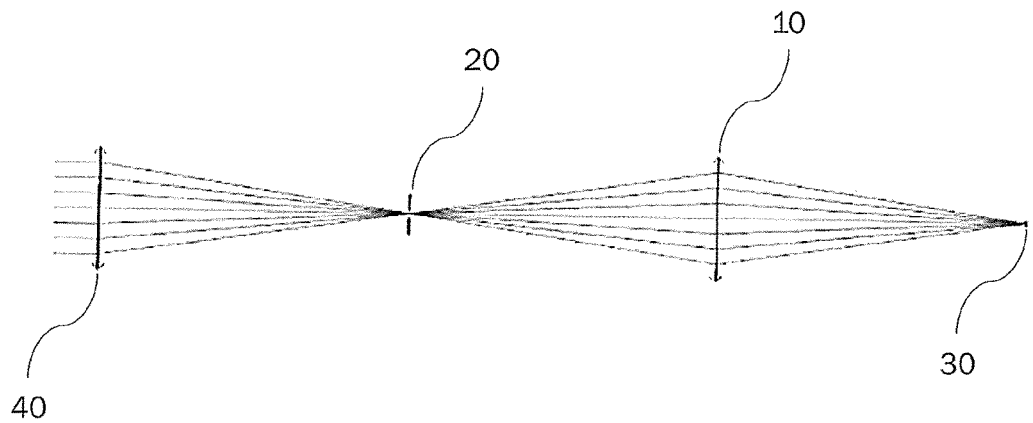
Figure 1B:
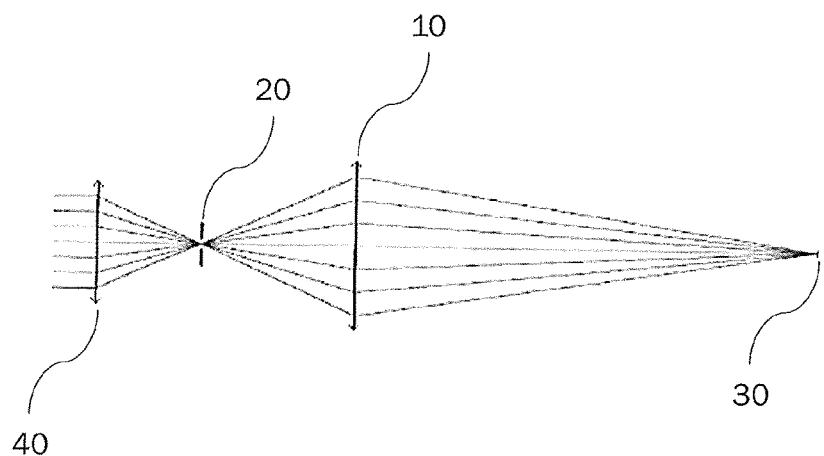

In the following, exemplary embodiments of the disclosure will be described with reference to the appended figures. Identical elements in the figures may be indicated by identical reference numbers, and repeated description thereof may be omitted.

Broadly speaking, the present disclosure concerns the design and manufacture of a compact imaging spectrometer based on a reflective grating. The design is flexible and can achieve magnification values different from one. As indicated above, for some applications it may be better to have magnification lower than one (e.g., PAN sharpening), and for other applications it may be better to have magnification larger than one (e.g., design of more compact instruments). Imaging spectrometers proposed by the present disclosure allow to extend the magnification range both above and below one.

A basic design of an imaging spectrometer according to embodiments of the disclosure includes two (first and second) curved (e.g., concave or convex) optical elements. The optical elements are reflective optical elements. The reflective optical elements are arranged opposite each other, i.e., so as to face each other. One of them may be a mirror, and the other may be a reflective grating. Light coming from the object plane (e.g., from the slit) passes through a central aperture in the second optical element, and is reflected two times by the first optical element and two times by the second optical element before reaching the image plane. Therein, reflection is alternatingly by the first and second optical elements. Alternatively, the imaging spectrometer may be arranged such that a central aperture in the second optical element is not required and the light from the object plan directly hits the first optical element. An important property of this design is the double reflection from the two optical elements.

Incidentally, throughout this disclosure a curved reflective portion (or reflective optical element) being indicated as concave means that the reflective side (e.g., the side that is struck by the light when arranged in the imaging spectrometer) of the curved reflective portion (or reflective optical element) is concave. Likewise, a curved reflective portion (or reflective optical element) being indicated as convex means that the reflective side (e.g., the side that is struck by the light when arranged in the imaging spectrometer) of the curved reflective portion (or reflective optical element) is convex.

A constraint that applies to the design of imaging spectrometers is that the imaging spectrometer is required to be telecentric in the object space in order to be easily coupled with the type of telescopes usually employed for remote sensing cameras (e.g., three mirror anastigmat telescopes).

Possible values to be considered for the design are the following: slit length 30 mm, wavelength range 450 nm-650 nm, pixel size 30 μm, spectral sampling 5 nm/px, F# (ratio of effective focal length and effective aperture diameter) 2.9, and grating 50 lines/mm, first order. The wavelength range may be easily increased if needed by virtue of the reflective design of the imaging spectrometer.

Notably, all the designs for imaging spectrometers presented by the present disclosure have a magnification value x lower than one. A magnification 1/x (greater than one) can be obtained by exchanging the position of the slit plane and the focal plane.

In general, imaging spectrometers according to embodiments of the disclosure are configured as follows. The imaging spectrometer is adapted for receiving a beam of light from a slit and, after the beam of light having passed through the imaging spectrometer, outputting the beam of light to a focal plane. Therein, the output beam of light at the focal plane is dispersed in accordance with a spectral composition (e.g., spectrum) of the beam of light received from the slit. The imaging spectrometer comprises first to fourth curved (e.g., concave or convex) reflective portions. The curved reflective portions are arranged within the imaging spectrometer so that the beam of light, in its passage from the slit to the focal plane, sequentially strikes (e.g., impinges on) the first to fourth curved reflective portions and is reflected by the first to fourth curved reflective portions. Therein, it is understood that the beam of light passes directly from the first curved reflective portion to the second curved reflective portion, from the second curved reflective portion to the third curved reflective portion, and from the third curved reflective portion to the fourth curved reflective portion, without interaction with other (solid) optical elements in its respective passages. The first to fourth curved reflective portions are alternatingly concave or convex, respectively, along the passage of the beam of light. At least one (e.g., two) of the first to fourth curved reflective portions has a reflective grating structure. The first and third curved reflective portions may be jointly arranged (e.g., formed) on a first (monolithic) reflective optical element, and the second and fourth curved reflective portions may be jointly arranged (e.g., formed) on a second (monolithic) reflective optical element.

In this case, the imaging spectrometer comprises the first and second reflective optical elements, and the surfaces of the first and second reflective optical elements are configured so as to provide the first and third, and second and fourth, respectively, curved reflective portions. One of the reflective optical elements is concave, and the other one of the reflective optical elements is convex, leading to the alternatingly concave and convex configuration of the first to fourth curved reflective portions along the passage of the beam of light.

One of the reflective optical elements is a (reflective) mirror (e.g., optical mirror). The other one may be a reflective grating, such as a blazed grating, or may be of a hybrid structure (mixed structure) of a reflective grating, such as a blazed grating, and a mirror. Since the beam of light is reflected twice by each of the first and second reflective optical elements, they may be said to each have two areas which are (or include) respective areas struck by the beam of light. The other one of the reflective optical elements has an area (e.g., a first region) that has a (first) reflective grating structure (i.e., in which the (first) reflective grating structure is formed), and another, distinct, area (e.g., a second region). If the other one of the reflective optical elements is of the hybrid structure, the other area (e.g., second region) is a (reflective) mirror (or more generally, has an (optical) mirror structure). On the other hand, if the other one of the reflective optical elements is the reflective grating, also the other area (e.g., second region) has a (second) reflective grating structure formed thereon. The one of the reflective optical elements (that is the reflective mirror) may have third and fourth regions as its aforementioned areas.

It is understood that respective ones of the first to fourth curved reflective portions are formed in the first to fourth regions, keeping in mind that the first and third curved reflective portions are formed on a common reflective optical element, and that the second and fourth curved reflective portions are arranged on a common reflective optical element. That is, one of the first to fourth curved reflective portions is arranged in the first region and has the first reflective grating structure. Another one of the first to fourth curved reflective portions (but not a curved reflective portion that is adjacent to the one of the first to fourth curved reflective portions along the passage of the beam of light) is arranged in the second region and has the second optical grating structure or has the optical mirror structure, depending on whether the other one of the reflective optical elements is the reflective grating or has the hybrid structure. The two remaining ones of the first to fourth curved reflective portions are arranged in the third and fourth portions of the one of the reflective optical elements (that is the reflective mirror).

Figure 6A:
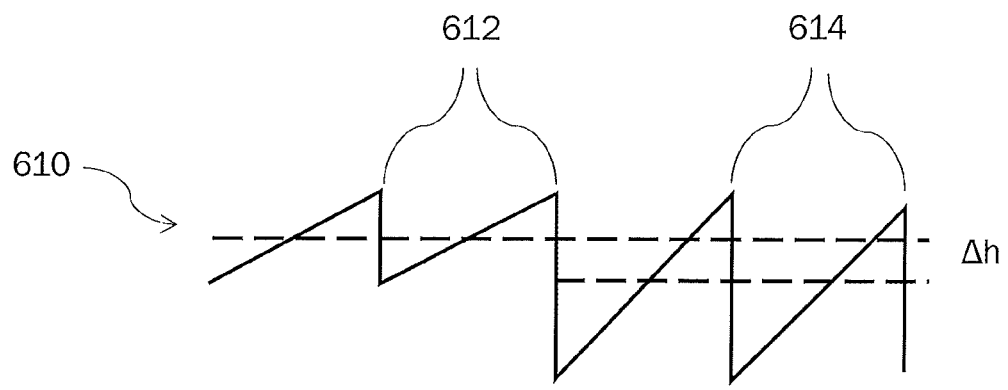
Figure 6B:
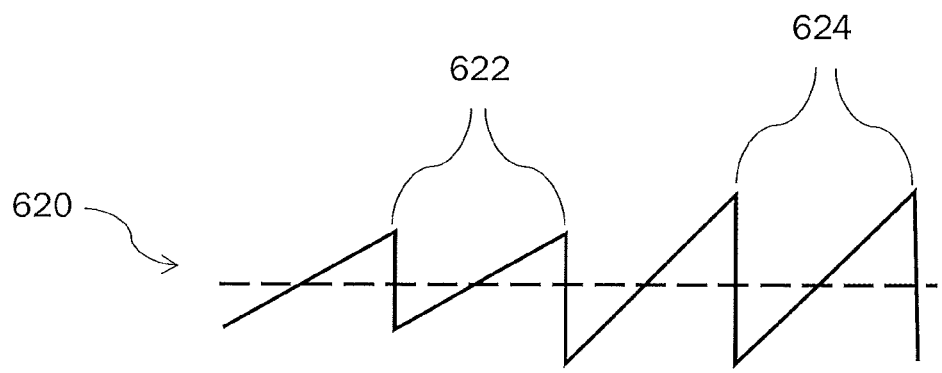

In embodiments, the first and second reflective grating structures may be different from each other, i.e., they may differ in at least one geometric parameter. For the case of a blazed grating, the geometric parameter may be a height of the grating lines of the blazed grating, the blaze angle of the blazed grating, or a line spacing (grove density) of the blazed grating, for example. Different configurations in which a first and a second region of a blazed grating differ in the blaze angle and in the height of the grating lines by an amount Δh are shown in FIG. 6A and FIG. 6B. In FIG. 6A, the topmost portions of the grating lines in the two regions are at equal height level, whereas in FIG. 6B middle portions of the grating lines in the two regions are at equal height level.

Likewise, in embodiments the third and fourth regions, which are (reflective) mirrors may differ from each other, for example in their curvature.

The first and second reflective optical elements may have a number of different combinations of shapes. In one example, the one of the first and second reflective optical elements and the other one of the first and second reflective optical elements are both conically shaped. In another example, the one of the first and second reflective optical elements (i.e., the mirror) is conically shaped and the other one of the first and second reflective optical elements (i.e., the reflective grating or the grating-mirror hybrid) is parabolically shaped.

It is understood that the present disclosure foresees configurations of imaging spectrometers in which the first to fourth curved reflective portions are provided as four separate reflective optical elements, configurations in which two of the first to fourth curved reflective portions are arranged on a common reflective optical element and the remaining two of the first to fourth curved reflective portions are provided as two separate reflective optical elements, and configurations in which respective pairs of two of the first to fourth curved reflective portions are arranged on respective common reflective optical elements.

Next, non-limiting examples of imaging spectrometers according to embodiments of the disclosure will be described. It is understood that for each of these imaging spectrometers the position of the slit and the focal plane may be exchanged for each other, i.e., the course of the beam of light may be reversed. The reversal of the course of the beam of light corresponds to exchanging, in the below description, the first reflective optical element for the second reflective optical element, and respectively exchanging the first to fourth curved reflective portions for the fourth to first curved reflective portions. Thus, although not necessarily described in the remainder of the disclosure, also those imaging spectrometers that can be derived from the explicitly described imaging spectrometer by the aforementioned changes are considered to be included in the scope of the present disclosure.

Imaging Spectrometer with Central Obstruction

Figure 2:
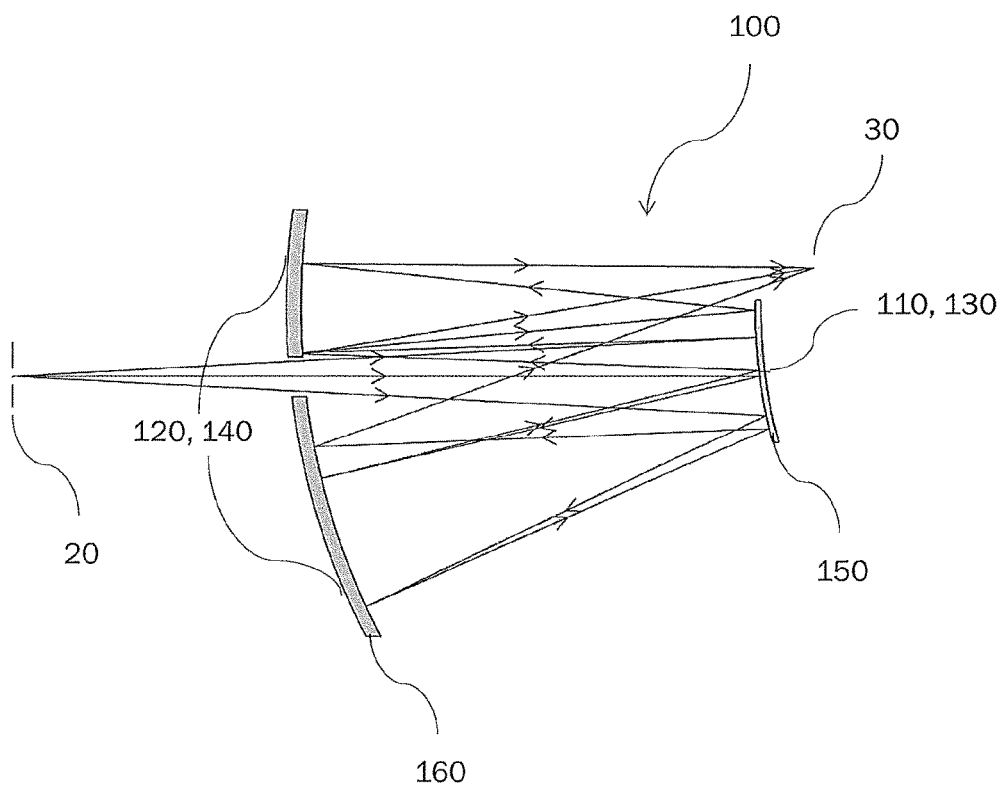

A first example of an imaging spectrometer 100 according to embodiments of the disclosure is shown in FIG. 2. The imaging spectrometer 100 comprises a first reflective optical element 150 and a second reflective optical element 160. Either or both reflective optical elements may be monolithic, e.g., may have a contiguous surface. The first reflective optical element 150 is a reflective grating, and the second reflective optical element 160 is a (reflective) mirror (e.g., optical mirror). Both reflective optical elements 150, 160 are curved (e.g., concave or convex). In particular, one of them is concave (e.g., the second reflective optical element 160), and the other one (e.g., the first reflective optical element 150) is convex. The light coming from the slit 20 passes through a central obstruction (e.g., opening) in the second reflective optical element 160 and is reflected in sequence by the first reflective optical element 150 (e.g., by a first curved reflective portion 110 formed on the first reflective optical element 150), the second reflective optical element 160 (e.g., by a second curved reflective portion 120 formed on the second reflective optical element 160), again the first reflective optical element 150 (e.g., by a third curved reflective portion 130 formed on the first reflective optical element 150), and again the second reflective optical element 160 (e.g., by a fourth curved reflective portion 140 formed on the second reflective optical element 160). The first and third curved reflective portions 110, 130 may be overlapping in this example. Likewise, the second and fourth curved reflective portions 120, 140 may be overlapping in this example.

Due to the multiple reflections within the grating and the mirror (i.e., the first and second reflective optical elements 150, 160), the spectrometer design is very compact. The image quality is very good and the smile and keystone which are critical aberrations for imaging spectrometers are very well corrected (e.g., both smaller than 3 µm, i.e., $\frac{1}{10}^{th}$ of the pixel).

Notably, the best optical quality for the imaging spectrometer 100 can be obtained if both a conic shaped mirror and a conic shaped grating are used, i.e., if both the first and second reflective optical elements have a conic shape. A solution with only spherical surfaces (i.e., with spherically shaped first and second reflective optical elements) is possible but would result in somewhat degraded image quality. Nevertheless, this choice could be of interest for the realization of low cost instruments.

An important property of the imaging spectrometer 100 is the double diffraction from the grating (i.e., the first reflective optical element 150). Said double diffraction allows to reduce the overall size of the imaging spectrometer for a given desired spectral resolution.

Starting from the above configuration of the imaging spectrometer 100, the design may be further improved in order to arrive at a completely unobstructed configuration. The unobstructed configuration may be arrived at by introducing a proper tilt angle of the imaging spectrometer and by decentering the grating-mirror subsystem (i.e., by decentering the first and second reflective optical elements). Using the unobstructed configuration, a longer slit, meaning a larger field of view of the optical instrument including the imaging spectrometer, can be accommodated. For example, the imaging spectrometers of unobstructed configuration may be used with a slit length of (about) 40 mm, compared to a slit length of (about) 30 mm for the imaging spectrometer 100 of obstructed configuration, at an overall axial length of the imaging spectrometer of (about) 170 mm between slit and focal plane.

Several non-limiting examples of imaging spectrometers in an unobstructed configuration according to embodiments of the disclosure will be described in the following. All these imaging spectrometers have been found to provide for good image quality. Further, if a larger field of view is desired for a respective application, imaging spectrometers of unobstructed configuration may be preferable over the imaging spectrometer of obstructed configuration described above.

Imaging Spectrometer with Parabolic Grating and Conic Mirror

Figure 3:
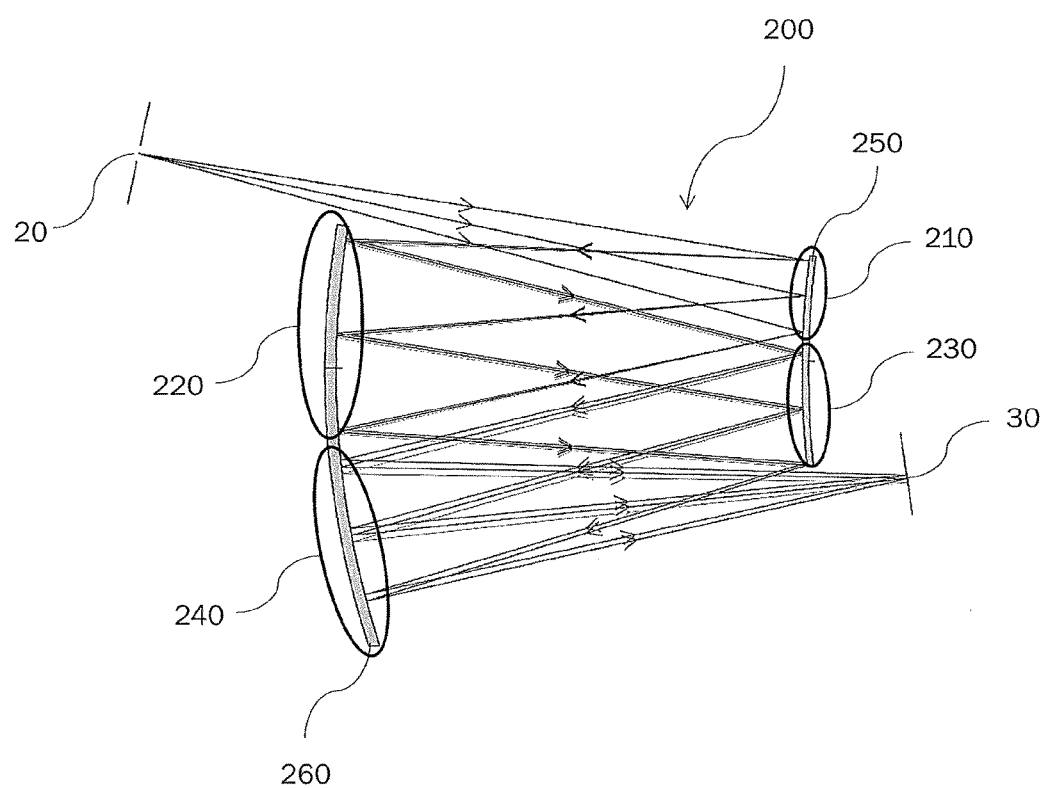

A second example of an imaging spectrometer 200 according to embodiments of the disclosure is shown in FIG. 3. The imaging spectrometer 200 comprises a convex, parabolic reflective grating and a concave, conic mirror. That is, one of the first and second reflective optical elements is the concave, conic mirror, and the other one is the convex, parabolic reflective grating. Which one of the reflective optical elements is the mirror and which one is the reflective grating depends on the arrangement of the slit 20 and the focal plane 30, as indicated above. In the example of FIG. 3, the first reflective optical element 250 is the reflective grating, and the second reflective optical element 260 is the mirror. As indicated above, the design of the imaging spectrometer 200 is unobstructed, that is, the reflective grating and the mirror are decentered with respect to each other and the beam of light from the slit 20 passes by the mirror and impinges on the grating. Accordingly, the mirror is not required to have an opening for allowing passage of the beam of light from the slit 20 to the grating.

Referring to the above general configuration of an imaging spectrometer according to embodiments of the disclosure, in the example of FIG. 3, the one of the reflective optical elements is the second reflective optical element 260, and the other one of the reflective optical elements is the first reflective optical element 250. Accordingly, the one of the reflective optical elements has a conic shape, and the other one of the reflective optical elements has parabolic shape. Further, the first and second regions are arranged on the first reflective optical element 250, and the third and fourth regions are arranged on the second reflective optical element 260. The first curved reflective portion 210 is arranged (e.g., formed) in the first region and has the first reflective grating structure, and the third curved reflective portion 230 is arranged in the second region and has the second reflective grating structure. Further, the second curved reflective portion 220 is arranged in the third region, and the fourth curved reflective portion 240 is arranged in the fourth region.

As indicated above, the first and second reflective optical elements 250, 260 would have to be replaced by each other, and likewise the first to fourth curved reflective portions would have to be replaced by the fourth to first curved reflective portions, respectively, if the above description of the imaging spectrometer 200 were to be adapted to the case in which the position of the slit and the focal plane are exchanged for each other. Then, the one of the reflective optical elements would be the first reflective optical element 250, and the other one of the reflective optical elements would be the second reflective optical element 260. The first and second regions would be arranged on the second reflective optical element 260, and the third and fourth regions would be arranged on the first reflective optical element 250. The fourth curved reflective portion 240 would be arranged (e.g., formed) in the first region and have the first reflective grating structure, and the second curved reflective portion 220 would be arranged in the second region and have the second reflective grating structure. Further, the third curved reflective portion 230 would be arranged in the third region, and the first curved reflective portion 210 would be arranged in the fourth region. It is understood that analogous replacements apply to the other examples of imaging spectrometers according to embodiments of the disclosure, and these analogous replacements will not be spelled out for the sake of conciseness.

In a modification of the second example, both the reflective grating and the mirror may have a conic shape. That is, referring to the above general configuration of an imaging spectrometer according to embodiments of the disclosure, both the one of the reflective optical elements and the other one of the reflective optical elements may have a conic shape. Apart from this modification, the same statements as made above apply.

Imaging Spectrometer with Spherical Grating and Freeform Mirror

A disadvantage of the foregoing second example may be the possible manufacturing complexity and cost of a parabolic grating compared to a spherical one. Accordingly, in a third example of an imaging spectrometer according to embodiments of the disclosure, the convex parabolic reflective grating in the imaging spectrometer 200 is replaced by a convex spherical reflective grating, and the concave conic mirror is replaced by a concave freeform mirror. Apart from these replacements, the same statements as made for the second example apply.

In the third example, the (spherical) grating can be manufactured in a simple manner. However, there is increased complexity is the manufacturing of the freeform mirror. Nevertheless, the inventors have assessed feasibility of manufacturing a suitable freeform mirror and no major issues have emerged.

Imaging Spectrometer with Grating Working in Single Diffraction

The first to third examples of imaging spectrometers presented above share the characteristics that the grating is struck twice, and thus twice disperses the light (double diffraction). This may have advantages and drawbacks. An advantage is that a higher spectral resolution can be achieved with double dispersion. A disadvantage is that the overall instrument throughput can be low in the spectral regions where the grating efficiency is low. For applications requiring a high throughput, it may therefore be preferable to have a design solution based on single grating dispersion (single diffraction). This option is available because there is a beam separation at the grating location, so that a reflective optical element that is half a mirror and half a grating, i.e., that has a hybrid, or mixed, structure can be used. In this case there is a single dispersion in the instrument. The groove density of the reflective grating can be increased by a factor of two (i.e., the line spacing can be halved) to get the same dispersion as for the double diffraction configuration. This also simplifies the implementation of holographic gratings. Notably, a groove density larger than 100 lines/mm is considered a feasible limit by Zeiss for holographic gratings.

Figure 4A:
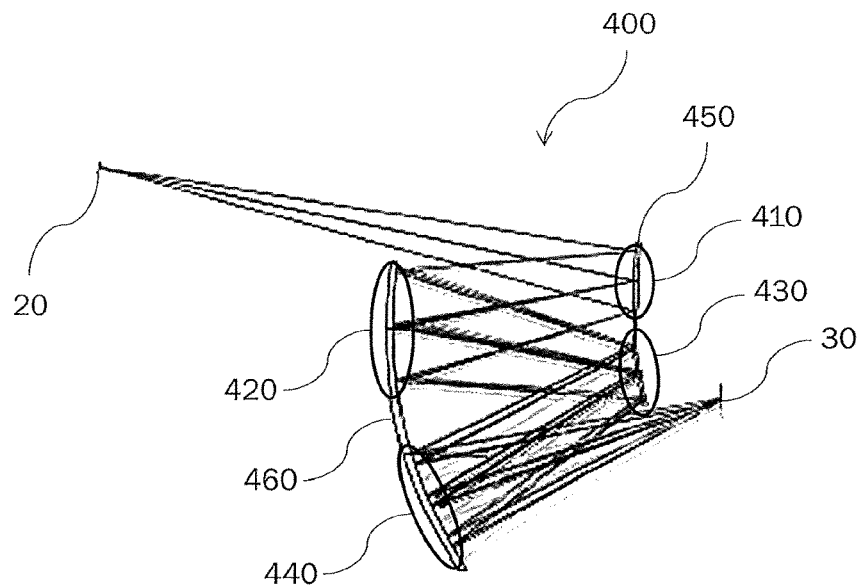
Figure 4B:
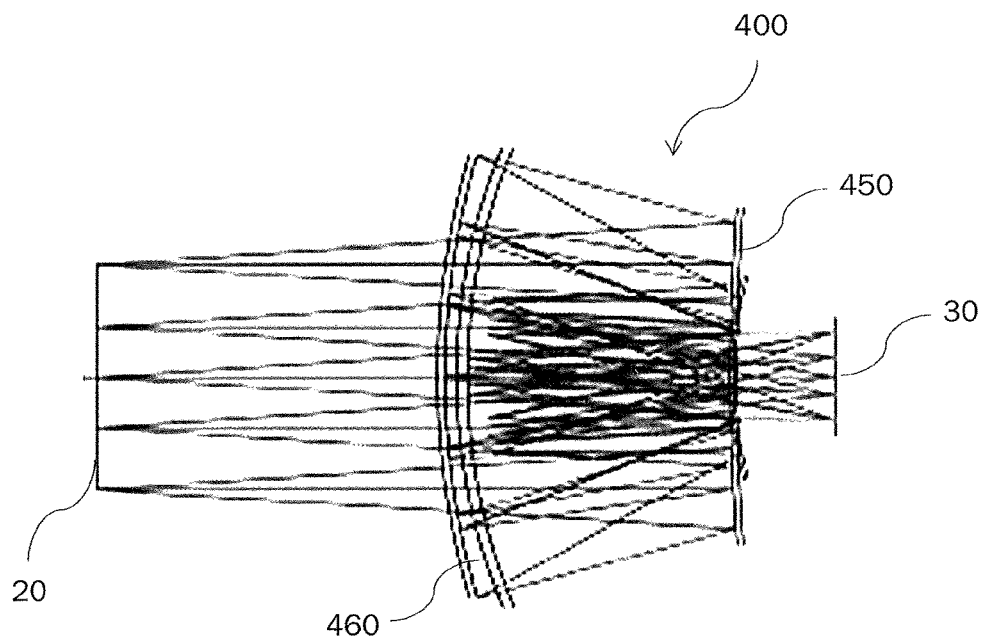

Thus, a fourth example of an imaging spectrometer 400 according to embodiments of the disclosure relates to an imaging spectrometer with single grating dispersion (single diffraction). The fourth example is illustrated in FIG. 4A and FIG. 4B, of which FIG. 4A shows a lateral view of the imaging spectrometer 400 and FIG. 4B shows a top view of the imaging spectrometer 400.

In the imaging spectrometer 400 of the fourth example, the first reflective optical element 450, which had been a reflective grating in the foregoing examples is replaced by a reflective optical element that is of a hybrid structure (mixed structure) of a reflective grating and a mirror. This reflective optical element has first and second regions, which have a reflective grating structure, and a mirror structure, respectively. Compared to the foregoing examples, the second region now has the mirror structure instead of the reflective grating structure. The first curved reflective portion 410 is arranged in the first region (having the reflective grating structure), and the third curved reflective portion 430 is arranged in the second region (having the mirror structure). Accordingly, only one of the first to fourth curved reflective portions has a reflective grating structure, while the remaining three of the first to fourth curved reflective portions have a mirror structure. The second and fourth curved reflective portions 420, 440 are arranged on the second reflective optical element 460.

The modification described with reference to the fourth example may be applied to any of the first to third examples by replacing the reflective optical element that is the reflective grating by the reflective optical element that has the hybrid structure. Therein, the respective shape of the reflective optical elements is not changed with respect to the first to third examples. In a further modification, the position of the first and second regions on the first reflective optical element 450 could be exchanged for each other, i.e., the first curved reflective portion 410 could be arranged in the second region (i.e., have the mirror structure), and the third curved reflective portion 430 could be arranged in the first region (i.e., have the reflective grating structure). Moreover, analogous replacement rules to the ones set out above would apply if the imaging spectrometer 400 of the fourth example were to be adapted to the case in which the position of the slit and the focal plane are exchanged for each other.

Imaging Spectrometer with Spherical Grating and Three Different Aspherical Mirrors Following the same line of thought and using the beam separation also for the mirror, it is possible to split the mirror into two mirrors with different shape (e.g., different curvature).

Figure 5A:
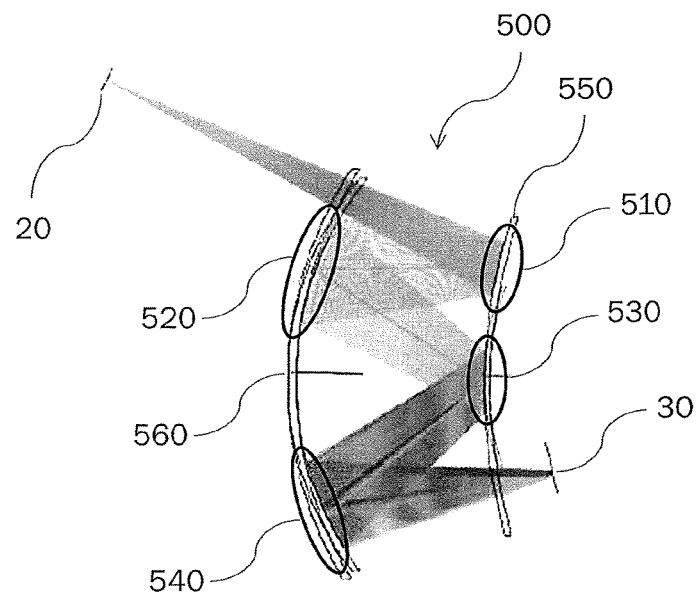
Figure 5B:
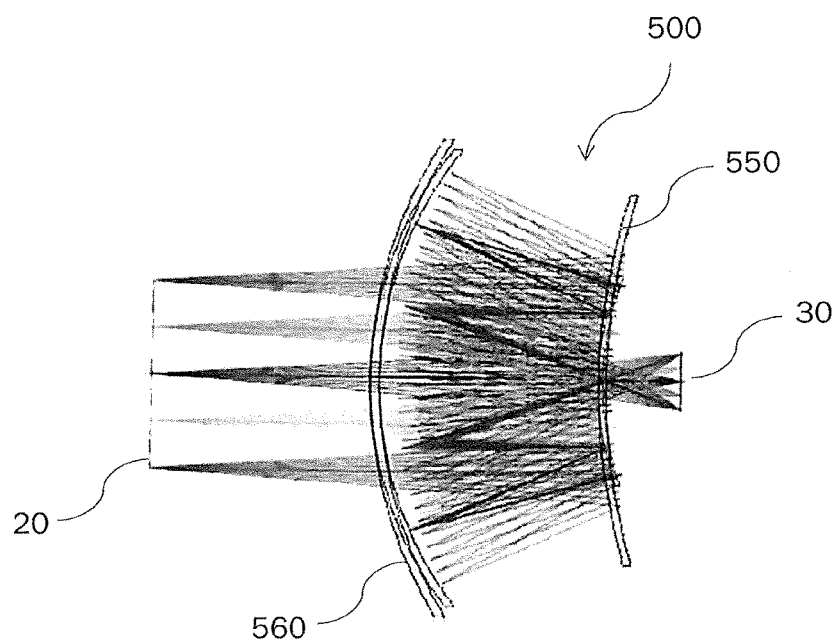

Thus, a fifth example of an imaging spectrometer 500 according to embodiments of the disclosure relates to an imaging spectrometer with single grating dispersion (single diffraction) and three different (e.g., aspherical) mirrors. The fifth example is illustrated in FIG. 5A and FIG. 5B, of which FIG. 5A shows a lateral view of the imaging spectrometer 500 and FIG. 5B shows a top view of the imaging spectrometer 500.

As was the case for the fourth example, in the imaging spectrometer 500 of the fifth example the first reflective optical element 550, which had been a reflective grating in the first to third examples is replaced by a reflective optical element that is of a hybrid structure (mixed structure) of a reflective grating and a mirror. This reflective optical element has first and second regions, which have a reflective grating structure, and a mirror structure, respectively. Compared to the first to third examples, the second region now has the mirror structure instead of the reflective grating structure. The first curved reflective portion 510 is arranged in the first region (having the reflective grating structure), and the third curved reflective portion 530 is arranged in the second region (having the mirror structure). Accordingly, only one of the first to fourth curved reflective portions has a reflective grating structure, while the remaining three of the first to fourth curved reflective portions have a mirror structure.

The second and fourth curved reflective portions 520, 540 are arranged on the second reflective optical element 560. In the fifth example, the second reflective optical element 560 has third and fourth regions (with respective mirror structures) which differ from each other with respect to their shape (e.g., with respect to their curvature). The third and fourth regions may further differ from the second region with respect to their shape (e.g., curvature), i.e., shapes (e.g., curvatures) of the second to fourth regions may be pairwise different from each other.

Employing the imaging spectrometer design of the fifth example allows to achieve very good image quality, since more parameters (including the three mirror shapes, e.g., curvatures) are available that can be used for the optimization process. Smile and keystone are also perfectly corrected. Also with this configuration it is possible to achieve a broad range of magnification values.

The modification described with reference to the fifth example may be applied to any of the first to fourth examples by replacing the reflective optical element that is the mirror by a reflective optical element that has two mirror areas of different shape (e.g., curvature). Therein, the respective shape of the reflective optical element that is the reflective grating or has the hybrid structure is not changed with respect to the first to fourth examples. Moreover, analogous replacement rules to the ones set out above would apply if the imaging spectrometer 500 of the fifth example were to be adapted to the case in which the position of the slit and the focal plane are exchanged for each other.

Imaging Spectrometer with Multi Blazed Grating

In another modification that may be applied to the first to third examples, either alone or jointly with the modification of the fifth example, a dual blazed grating is provided. That is, the first and second regions on the reflective optical element that is the reflective grating would have different reflective grating structures. For example, the reflective grating structures may differ from each other in at least one geometric parameter, such as the blaze angle, for example. Such a situation is schematically illustrated in FIG. 6A and FIG. 6B.

For example, an imaging spectrometer design may be provided with an aspherical mirror and a spherical dual blazed diffraction grating. The spherical diffraction grating may be blazed for two diffraction orders. As indicated above, this can be achieved due to the separation of the beam on the reflective grating.

Also this modification can achieve good image quality, with keystone and smile corrected. The use of multi blazed grating can be used to tailor the spectral efficiency of the spectrometer, for example to compensate for the lower efficiency of the detector in some spectral regions.

Next, an example of a method of manufacturing an imaging spectrometer according to embodiments of the disclosure will be described with reference to FIG. 7 and FIG. 8. In particular, this method may relate to a method of manufacturing an imaging spectrometer for receiving a beam of light from a slit and outputting the beam of light to a focal plane, wherein the output beam of light at the focal plane is dispersed in accordance with a spectral composition of the beam of light received from the slit. It is understood that the described method of manufacturing may result (or may be modified to result) in any of the imaging spectrometers exemplarily described throughout this disclosure.

Figure 7:
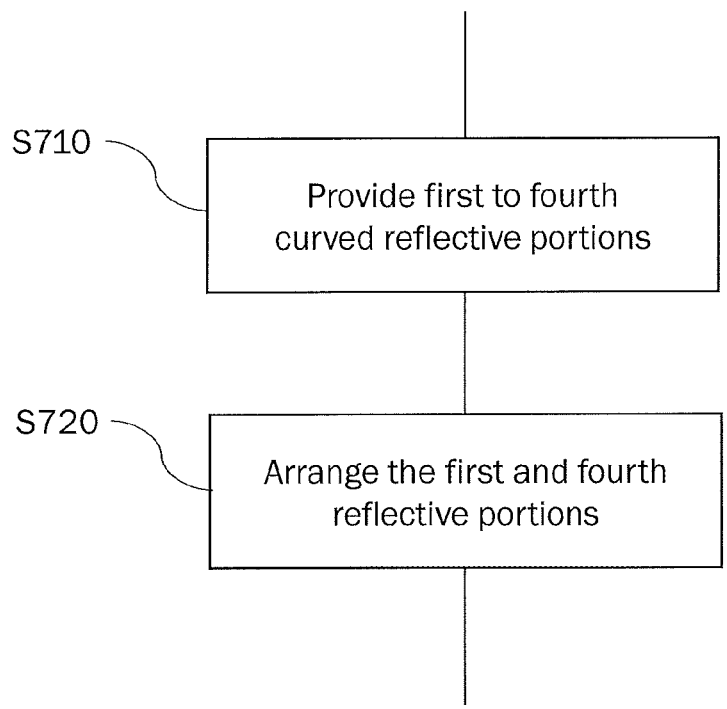
FIG. 7 is a flowchart schematically illustrating an example of a method of manufacturing an imaging spectrometer according to embodiments of the disclosure.

At step S710 in FIG. 7, first to fourth curved reflective portions are provided. Two of these portions are concave (i.e., have a concave shape), and two of these portions are convex (i.e., have a convex shape). Moreover, in the sequence of the first to fourth curved reflective portions, the first to fourth curved reflective portions may be alternatingly concave or convex. At least one of the first to fourth curved reflective portions has a reflective grating structure. For example, two of the first to fourth curved reflective portions may have the reflective grating structure or respective reflective grating structures.

At step S720, the first to fourth curved reflective portions are arranged (e.g., to thereby form the imaging spectrometer or part of the imaging spectrometer) so that the beam of light, in its passage from the slit to the focal plane, sequentially strikes the first to fourth curved reflective portions and is reflected by the first to fourth curved reflective portions. The first to fourth curved reflective portions are further arranged so that the first to fourth curved reflective portions, along the passage of the beam of light, are alternatingly concave or convex, respectively.

Examples of details of the method of FIG. 7 are now described with reference to FIG. 8.

Figure 8:
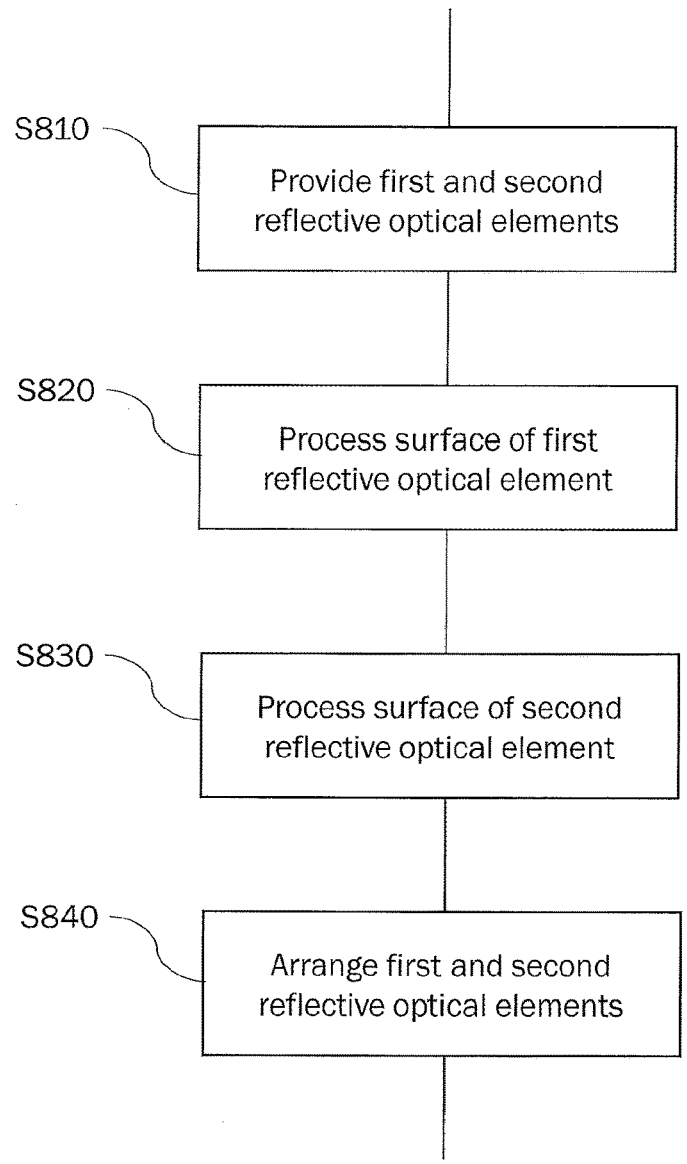
FIG. 8 is a flowchart schematically illustrating an example of details of the method of FIG. 7 according to embodiments of the disclosure.

At step S810 in FIG. 8, a first reflective optical element and a second reflective optical element are provided. One of them is convex, and the other one is concave.

At step S820, a surface of the first reflective optical element is processed to provide the first and third reflective portions on the first reflective optical element. At step S830, a surface of the second reflective optical element is processed to provide the second and fourth curved reflective portions on the second reflective optical element.

For example, one of the first and second reflective optical elements may be processed to be a mirror, and the other one of the first and second reflective optical elements may be processed to be a reflective grating or to have the hybrid structure described above. In this case, the surface of the other one of the first and second reflective optical elements may be processed to have to aforementioned first and second regions, and the surface of the one of the first and second reflective optical elements may be processed to have the aforementioned third and fourth regions.

It is understood that steps S810, S820, and S810 may result in any of the first to fourth curved reflective portions described throughout this disclosure.

At step S840, the first and second reflective optical elements are arranged so that the beam of light, in its passage from the slit to the focal plane, sequentially strikes the first to fourth curved reflective portions and is reflected by the first to fourth curved reflective portions. The one of the first and second reflective optical elements is either concave or convex, and the other one of the first and second reflective optical elements is concave if the one of the first and second reflective optical elements is convex, and is convex if the one of the first and second reflective optical elements is concave. In the above, steps S810, S820, and S830 represent an example implementation of step S710 in FIG. 7. That is, providing the first to fourth curved reflective portions may involve providing the first and second reflective optical elements and processing respective surfaces of the first and second reflective optical elements, as described above. Moreover, step S840 represents an example implementation of step S720 in FIG. 7. That is, arranging the first to fourth curved reflective portions may involve arranging the first and second reflective optical elements, as described above.

Unless indicated otherwise, gratings and mirrors described in the present disclosure are understood to be optical gratings and optical mirrors, respectively, and are understood to be reflective at least in the range of visible light (e.g., in the range 390 nm-700 nm, or at least in the range 450 nm-650 nm).

It should be noted that the method features described above correspond to respective apparatus features that may however not be explicitly described, for reasons of conciseness, and vice versa. The disclosure of the present document is considered to extend also to such apparatus features and such method features.

It should further be noted that the description and drawings merely illustrate the principles of the proposed methods and apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An imaging spectrometer for receiving a beam of light from a slit and outputting the beam of light to a focal plane, wherein the output beam of light at the focal plane is dispersed in accordance with a spectral composition of the beam of light received from the slit,
   wherein the imaging spectrometer comprises first to fourth curved reflective portions; and wherein:
   the first to fourth curved reflective portions are arranged so that the beam of light, in its passage from the slit to the focal plane, sequentially strikes the first to fourth curved reflective portions and is reflected by the first to fourth curved reflective portions;
   the first to fourth curved reflective portions are alternatingly concave or convex, respectively, along the passage of the beam of light;
   at least one of the first to fourth curved reflective portions has a reflective grating structure;
   the first and third curved reflective portions are formed on a first reflective optical element; and
   the second and fourth curved reflective portions are formed on a second reflective optical element.

2. The imaging spectrometer according to claim 1, wherein two of the first to fourth curved reflective portions have respective reflective grating structures.

3. The imaging spectrometer according to claim 1, wherein one of the first and second reflective optical elements is concave and the other one of the first and second reflective optical elements is convex.

4. The imaging spectrometer according to claim 3, wherein the one of the first and second reflective optical elements has third and fourth regions in which respective ones of the first to fourth curved reflective portions are arranged; and
   a curvature of the third region differs from a curvature of the fourth region.

5. The imaging spectrometer according to claim 3, wherein the one of the first and second reflective optical elements and the other one of the first and second reflective optical elements are both conically shaped.

6. The imaging spectrometer according to claim 3, wherein the one of the first and second reflective optical elements is conically shaped and the other one of the first and second reflective optical elements is parabolically shaped.

7. The imaging spectrometer according to claim 3, wherein the one of the first and second reflective optical elements is a freeform mirror and the other one of the first and second reflective optical elements is spherically shaped.

8. The imaging spectrometer according to claim 1, wherein the second reflective optical element is arranged opposite the first reflective optical element.

9. The imaging spectrometer according to claim 1, wherein one of the first and second reflective optical elements is an optical mirror and the other one of the first and second reflective optical elements has a first region in which a first reflective optical grating structure is formed; and
   one of the first to fourth curved reflective portions is arranged in the first region and has the first reflective optical grating structure.

10. The imaging spectrometer according to claim 9, wherein the other one of the first and second reflective optical elements has a second region in which a second reflective optical grating structure is formed; and
    another one of the first to fourth curved reflective portions is arranged in the second region and has the second reflective optical grating structure.

11. The imaging spectrometer according to claim 10, wherein the first and second reflective optical grating structures differ in at least one geometric parameter.

12. The imaging spectrometer according to claim 9, wherein the other one of the first and second reflective optical elements has a second region in which an optical mirror structure is formed; and
    another one of the first to fourth curved reflective portions is arranged in the second region and has the optical mirror structure.

13. A method of manufacturing an imaging spectrometer for receiving a beam of light from a slit and outputting the beam of light to a focal plane, wherein the output beam of light at the focal plane is dispersed in accordance with a spectral composition of the beam of light received from the slit, the method comprising:
    providing first to fourth curved reflective portions, of which two portions are concave and two portions are convex, and of which at least one portion has a reflective grating structure; and
    arranging the first to fourth curved reflective portions so that the beam of light, in its passage from the slit to the focal plane, sequentially strikes the first to fourth curved reflective portions and is reflected by the first to fourth curved reflective portions, and so that the first to fourth curved reflective portions, along the passage of the beam of light, are alternatingly concave or convex, respectively,
    wherein providing the first to fourth curved reflective portions involves:

providing a first reflective optical element and a second reflective optical element;

processing a surface of the first reflective optical element to provide the first and third reflective portions on the first reflective optical element; and processing a surface of the second reflective optical element to provide the second and fourth curved reflective portions on the second reflective optical element; and wherein arranging the first to fourth curved reflective portions involves arranging the first and second reflective optical elements so that the beam of light, in its passage from the slit to the focal plane, sequentially strikes the first to fourth curved reflective portions and is reflected by the first to fourth curved reflective portions.

14. The method according to claim 13, wherein the one of the first and second reflective optical elements is either concave or convex, and the other one of the first and second reflective optical elements is concave if the one of the first and second reflective optical elements is convex, and is convex if the one of the first and second reflective optical elements is concave.

15. The method according to claim 13, wherein two of the first to fourth curved reflective portions have respective reflective grating structures.

16. The method according to claim 13, wherein the second reflective optical element is arranged opposite the first reflective optical element.

17. The method according to claim 13, wherein one of the first and second reflective optical elements is an optical mirror and the other one of the first and second reflective optical elements has a first region in which a first reflective optical grating structure is formed; and one of the first to fourth curved reflective portions is arranged in the first region and has the first reflective optical grating structure.

18. The method according to claim 17, wherein the other one of the first and second reflective optical elements has a second region in which a second reflective optical grating structure is formed; and another one of the first to fourth curved reflective portions is arranged in the second region and has the second reflective optical grating structure.

* * * * *